United States Patent [19]

Miller et al.

[11] 4,402,069

[45] Aug. 30, 1983

[54] ACOUSTIC ENVELOPE HAVING MINIMAL VIBRATION AND FLOW INDUCED NOISES

[75] Inventors: Howard A. Miller, Encinitas; Charles S. Nichols, San Diego, both of Calif.

[73] Assignee: The United States of America as represented by the Secretary of the Navy, Washington, D.C.

[21] Appl. No.: 270,061

[22] Filed: Jun. 3, 1981

[51] Int. Cl.³ .............................................. H04R 1/44
[52] U.S. Cl. .................................. 367/154; 367/130; 367/176; 174/101.5
[58] Field of Search ...................... 367/130, 154, 176; 114/244, 247; 174/101.5

[56] References Cited

U.S. PATENT DOCUMENTS

| | | | |
|---|---|---|---|
| 3,304,364 | 2/1967 | Hetherington | 174/101.5 |
| 3,710,006 | 1/1973 | Davis | 174/101.5 |
| 4,011,540 | 3/1977 | Farr | 174/101.5 X |
| 4,090,168 | 5/1978 | Miller et al. | 367/130 X |

Primary Examiner—Richard A. Farley
Attorney, Agent, or Firm—Robert F. Beers; Ervin F. Johnston; Thomas Glenn Keough

[57] ABSTRACT

An acoustic envelope is provided which may include a tubular sheath which is mounted about a conducting element. The tubular sheath has inner and outer tubular portions which are integral with respect to one another. The acoustic envelope further includes a plurality of non-elastic strands which extend longitudinally along the sheath between the inner and outer tubular portions and which are bonded thereto. The tubular sheath is constructed of a material which optimally minimizes vibration induced noise and flow induced noise when the line array is towed through the water.

10 Claims, 5 Drawing Figures

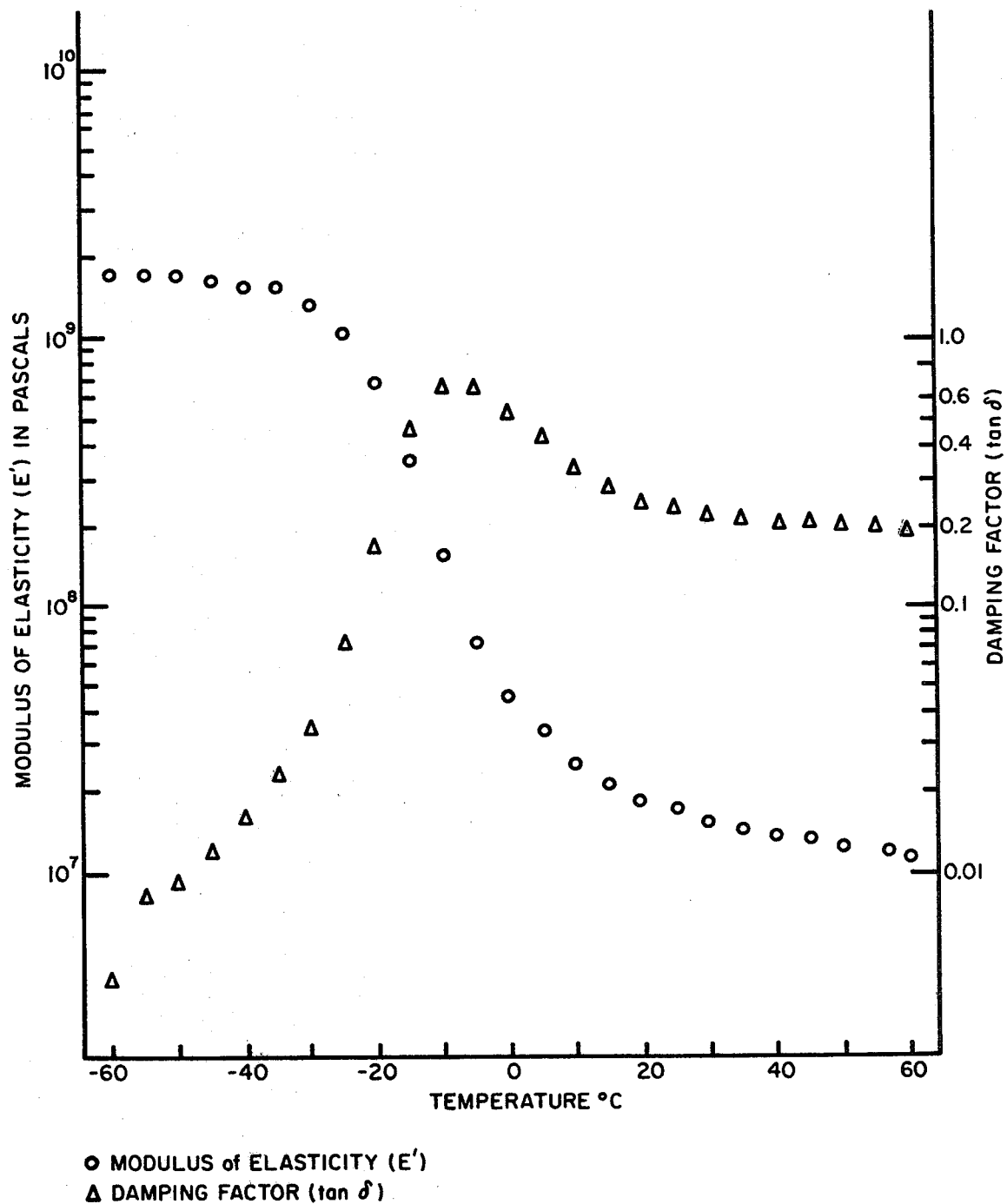
FIG. 4 (f = 11 Hz)

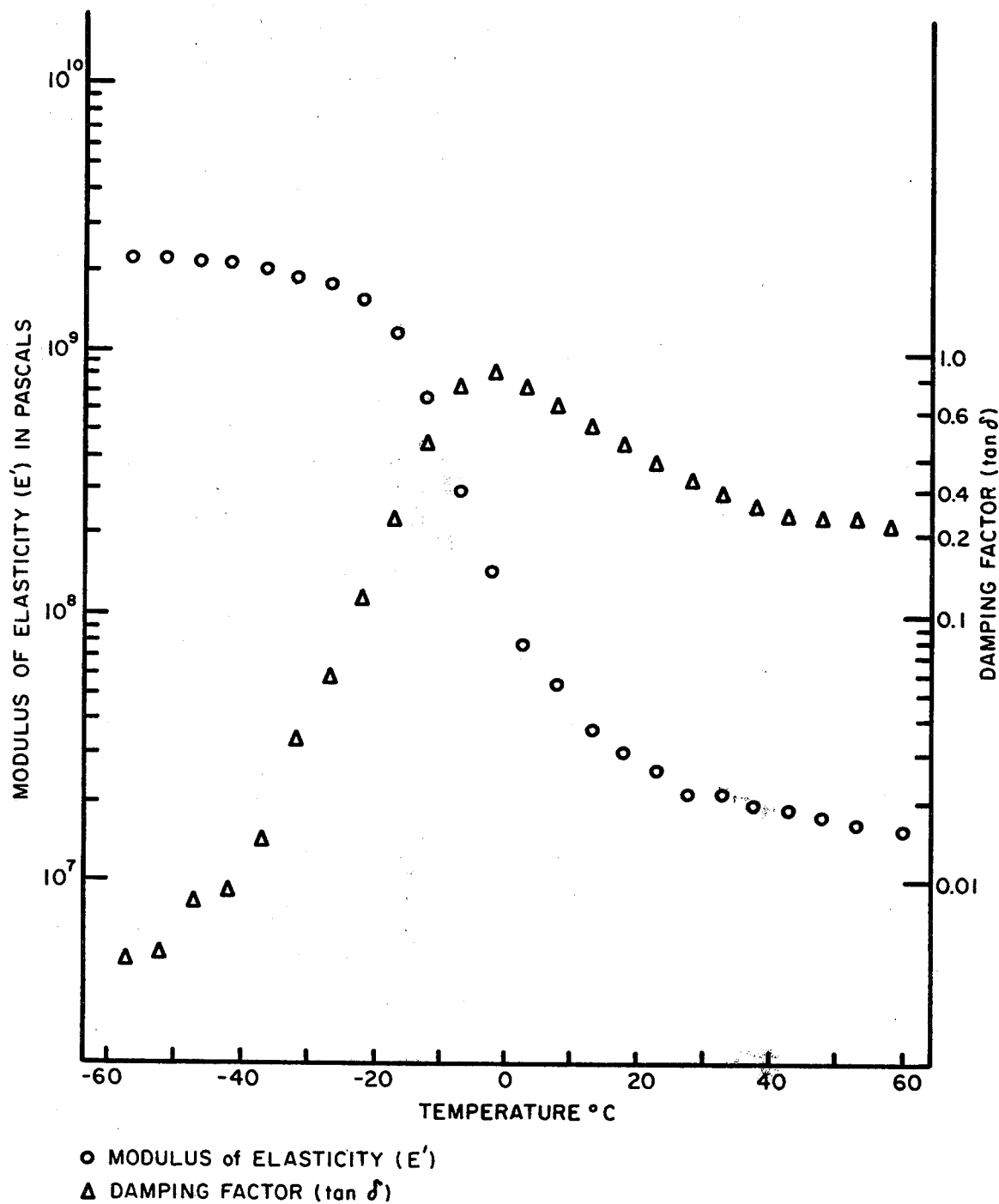
FIG.5 (f=110Hz)

ACOUSTIC ENVELOPE HAVING MINIMAL VIBRATION AND FLOW INDUCED NOISES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention pertains to an improved towed sonar line array.

Towed sonar line arrays are very efficient listening devices. These line arrays have discrete transducers which are spaced along the array and are connected to processing apparatus aboard the towing vehicle. It is important that these transducers, which are the listening elements, are maintained in a predetermined spacing as the array undergoes the dynamic towing operation. During this operation there is considerable stress on the array and the tendency is to elongate which results in inaccurate data being received at the listening apparatus.

Since the transducers are listening for sound from far field source it is imperative that the array induced noises be minimized. Two major induced noises are vibration induced noise, which is generated primarily at the down slope of the line array from the towing vessel to some depth, and the flow noise which occurs primarily along the straighter portion of the line array extending beyond the sloping portion of the line array. The vibration noise propagating into the array from the downward portion of the line array is sometimes referred to as strumming, and the flow induced noise along the remainder of the line array is due to turbulent flow immediately adjacent to the exterior surface of the line array. These induced noises have been troublesome for some time because of the prior art configurations and materials utilized. A common material utilized in the acoustic envelope of prior art sonar line arrays is polyvinyl chloride. The polyvinyl chloride has not had the radial compliance nor the damping characteristics that are necessary to minimize the self induced noise problems. The polyvinyl chloride is especially undesirable at low temperatures, such as those found in the Arctic.

Another problem with sonar line arrays is maintaining the longitudinal spacing between the transducers. In the past longitudinal fiber ribbons have been used to carry the longitudinal load. These ribbons result in unacceptable kinking during the construction. It is essential that the transducers be in their predetermined spacing during the towing operation.

OBJECTS OF THE INVENTION

An object of the present invention is to overcome the aforementioned problems associated with prior art towed line sonar arrays.

Another object is to provide an acoustic envelope for a conducting element wherein the acoustic envelope has minimal vibration and flow induced noises when towed.

A further object is to provide a line sonar array acoustic envelope which has minimal elongation and minimal vibration and flow induced noises when towed.

Still another object is to provide an improved line sonar array acoustic envelope which has minimal self induced noises over a wide range of temperatures when being towed.

Yet another object is to provide a line sonar array acoustic envelope which is simple in construction and yet highly efficient in its performance, especially in regard to minimal elongation, low self induced noises, and desirable damping characteristics.

Other objects, advantages and novel features of the invention will become apparent from the following detailed description of the invention when considered in conjunction with the accompanying drawings.

BRIEF DESCRIPTION OF THE DRAWINGS

FIG. 4 is a chart showing modulus of elasticity and damping factors versus temperature for a frequency of 11 Hz.

FIG. 5 is another chart showing modulus of elasticity and damping factors versus temperature for a frequency of 110 Hz.

DESCRIPTION OF THE PREFERRED EMBODIMENT

Figure 1:
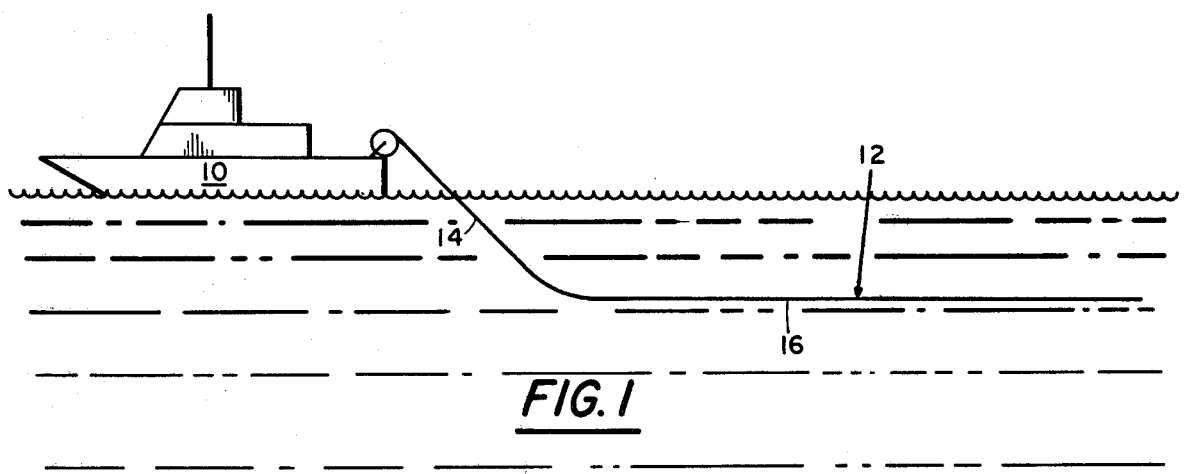
FIG. 1 is an ocean elevation view of a surface vessel towing a line sonar array.

Referring now to the drawings wherein like reference numerals designated like or similar parts throughout the several views, there is illustrated in FIG. 1 a surface vessel 10 towing a line sonar array 12. It should be noted that the line sonar array 12 has a downwardly extending portion 14 and a generally horizontally extending portion 16. The line sonar array has a plurality of spaced-apart transducer elements which are connected to a recording apparatus (not shown) on the surface vessel. It is important that these transducer elements are maintained at a predetermined spacing in order to obtain accurate acoustical data from far field sound sources. Further, it is important that the line sonar array have minimal self induced noises, such as those caused by vibration and flow. The vibration induced noise is generated primarily at the downwardly extending portion 14 of the line array, and is sometimes referred to as strumming. The flow induced noises primarily occur along the horizontal portion 16 of the line array.

Figure 2:
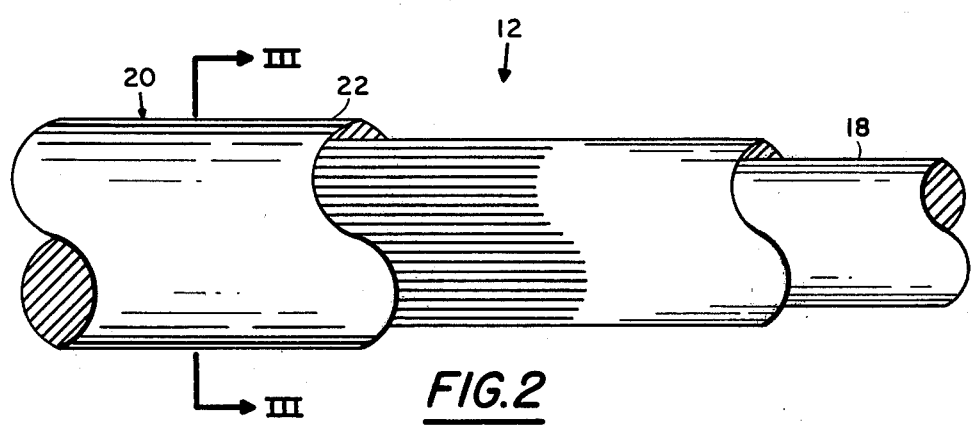
FIG. 2 is a portion of the line sonar array with portions thereof broken away to show various details thereof.
Figure 3:
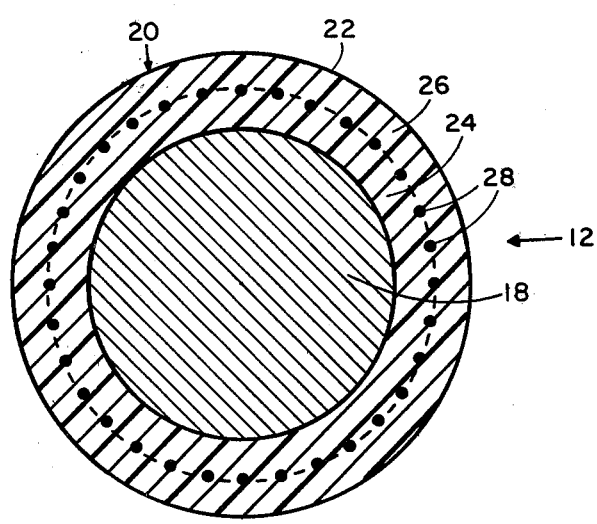
FIG. 3 is a view taken along plane III—III of FIG. 2.

As illustrated in FIGS. 2 and 3 the line sonar array 12 includes a core of elongated conducting means 18, which may be transducer elements and wires in combination, and an acoustic envelope which is generally shown at 20. The acoustic envelope 20 includes a tubular sheath 22 which has inner and outer tubular potions 24 and 26 which are integral with respect to one another. The acoustic envelope further includes a plurality of non-elastic strands 28 which extend longitudinally along the sheath between the inner and outer tubular portions 24 and 26 and which are bonded thereto.

The tubular sheath, which includes the inner and outer tubular portions 24 and 26, is constructed of a material which optimally minimizes vibration induced noise and flow induced noise when the line array is towed through the water. It has been discovered that butyl rubber optimally minimizes these self induced noises not only at normal temperatures, but also at temperatures over a wide range, such as 0° to 20° C. Also, it was found that the butyl rubber provides a damping factor which is greater than 0.4 which in turn provides a very desirable characteristic for the line sonar array. Still another highly desirable result from the butyl rubber is its ease of construction to an exterior smooth surface so as to minimize turbulence in the water layer adjacent the line sonar array.

Another important feature of the present invention is the material utilized for the non-elastic strands 28. The material used for these strands is aramid which is sold by DuPont under the trademark Kevlar. With the longitudinally extending Kevlar strands 28 the line sonar array is assured of minimal longitudinal elongation during tow by the surface vessel 10. As illustrated in FIGS. 2 and 3 the longitudinal strands 28 do not in any way spiral within the sheath 20, but in contrast extend in a straight parallel relationship. While the aramid strands 28 are extremely resistive to longitudinal strain they work in a highly desirable cooperative relationship with the already established optimal radial compliance of the sheath 20 which is provided by the butyl rubber material.

FIGS. 4 and 5 illustrate the modulus of elasticity and damping factor of butyl rubber at various temperatures at 11 Hz and 110 Hz, respectively. Reference has been made hereinabove to operation over a wide range of temperatures which will be defined herein as 0° to 20° C. These temperatures will cover the operation of line sonar arrays at the Arctic as well as the equator. It can be seen from the charts in FIGS. 4 and 5 that the range of Young's modulus of elasticity over these temperatures at 11 Hz and 110 Hz is between two times $10^7$ to one times $10^8$ Pascals and that the damping factor is greater than 0.4.

These characteristics provide an optimal radial compliance, which is unimpeded by the aramid strands 28, and high acoustic damping properties. The optimal radial compliance provides minimal vibration due to strumming action along the downwardly extending portion 14 of the line sonar array and minimal flow induced noise due to turbulence in the water layer immediately adjacent the longitudinal portion 16 of the line sonar array.

As stated hereinabove the tubular sheath 20 is integral. Several methods can be utilized in constructing this sheath namely extrusion or vulcanizing. In the extrusion process the strands 28 and the sheath are extruded in one combination. In the vulcanizing process the inner and outer portions 24 and 26 are provided with the longitudinal strands 28 in place and the combination is heated until vulcanization takes place to provide the integral sheath 20. In both instances the exterior surface of the sheath 20 is extremely smooth which provides again a characteristic which will minimize self induced noise.

Obviously many modifications and variations of the present invention are possible in the light of the above teachings. It is therefore to be understood that within the scope of the appended claims the invention may be practiced otherwise than as specifically described.

We claim:

1. A towed line sonar array comprising:
    elongated conducting means;
    only one tubular sheath;
    said one tubular sheath being mounted in an engaging relationship about and along the elongated conducting means;
    the tubular sheath having inner and outer tubular portions which are integral with respect to one another;
    a plurality of non-elastic strands extending longitudinally along the sheath between the inner and outer tubular portions and being bonded thereto; and
    the sheath being a material with a Youngs modulus of elasticity from two times $10^7$ to one times $10^8$ Pascals and a damping factor greater than 0.4 in a frequency range from 11 Hz to 110 Hz and in a temperature range from 0° to 20° C. so that the sheath has high radial compliance and high acoustic damping properties.

2. A towed line sonar array as claimed in claim 1 wherein:
    the non-elastic strands are aramid; and
    the aramid strands are substantially equispaced about and from the conducting means.

3. A towed line sonar array as claimed in claim 1 wherein:
    the tubular sheath is butyl rubber.

4. A towed line sonar array as claimed in claim 3 wherein:
    the non-elastic strands are aramid; and
    the aramid strands are substantially equispaced about and from the conducting means.

5. A towed line sonar array as claimed in claim 3 wherein:
    the inner and outer portions are vulcanized portions.

6. A towed line array as claimed in claim 5 wherein:
    the non-elastic strands are aramid; and
    the aramid strands are substantially equispaced about and from the conducting means.

7. A towed line sonar array consisting essentially of:
    a core of elongated conducting means;
    an acoustic envelope;
    the acoustic envelope including a single tubular sheath which is mounted in an engaging relationship about the conducting means with the conducting means located centrally therein;
    the tubular sheath having inner and outer tubular portions which are integral with respect to one another;
    the acoustic envelope further including a plurality of non-elastic strands extending longitudinally along the sheath between the inner and outer tubular portions and being bonded thereto;
    the non-elastic strands being equispaced about and from the conducting means; and
    the tubular sheath being constructed of a material which optimally minimizes vibration induced noise and flow induced noise when the line array is towed through water.

8. A towed array as claimed in claim 7 consisting essentially of:
    the tubular sheath being a material which has a Young's modulus of elasticity from two times $10^7$ to one times $10^8$ Pascals and a damping factor greater than 0.4 in a frequency range from 11 Hz to 110 Hz and in a temperature range from 0° to 20° C.

9. A towed array as claimed in claim 8 consisting essentially of:
    the tubular sheath being butyl rubber; and
    the non-elastic strands being aramid.

10. A towed array as claimed in claim 9 consisting essentially of:
    the conducting means being transducer elements and wires.

* * * * *